Feb. 24, 1959  R. J. SCHMID  2,874,587
HAND CONTROL MECHANISM FOR VEHICLES
Filed April 9, 1956  3 Sheets-Sheet 3
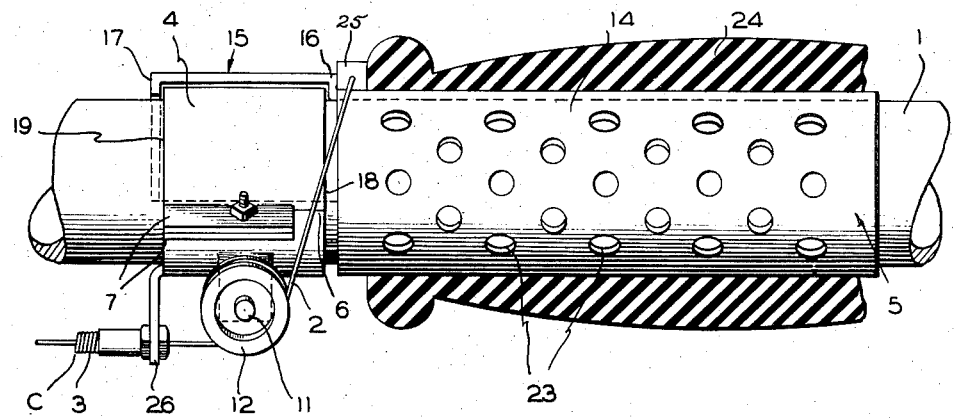
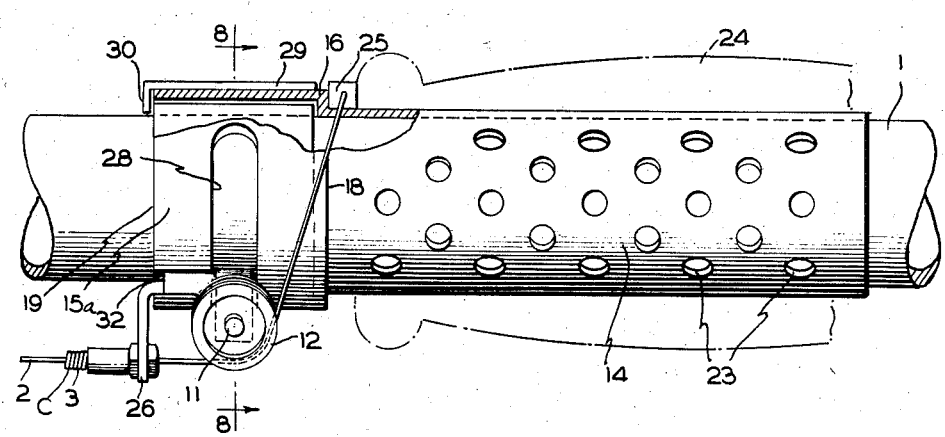
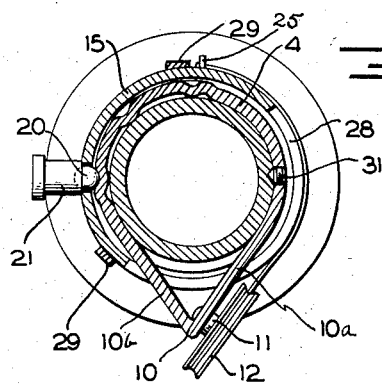
INVENTOR
ROY J. SCHMID
BY Edward H. Goodrich
ATTORNEY

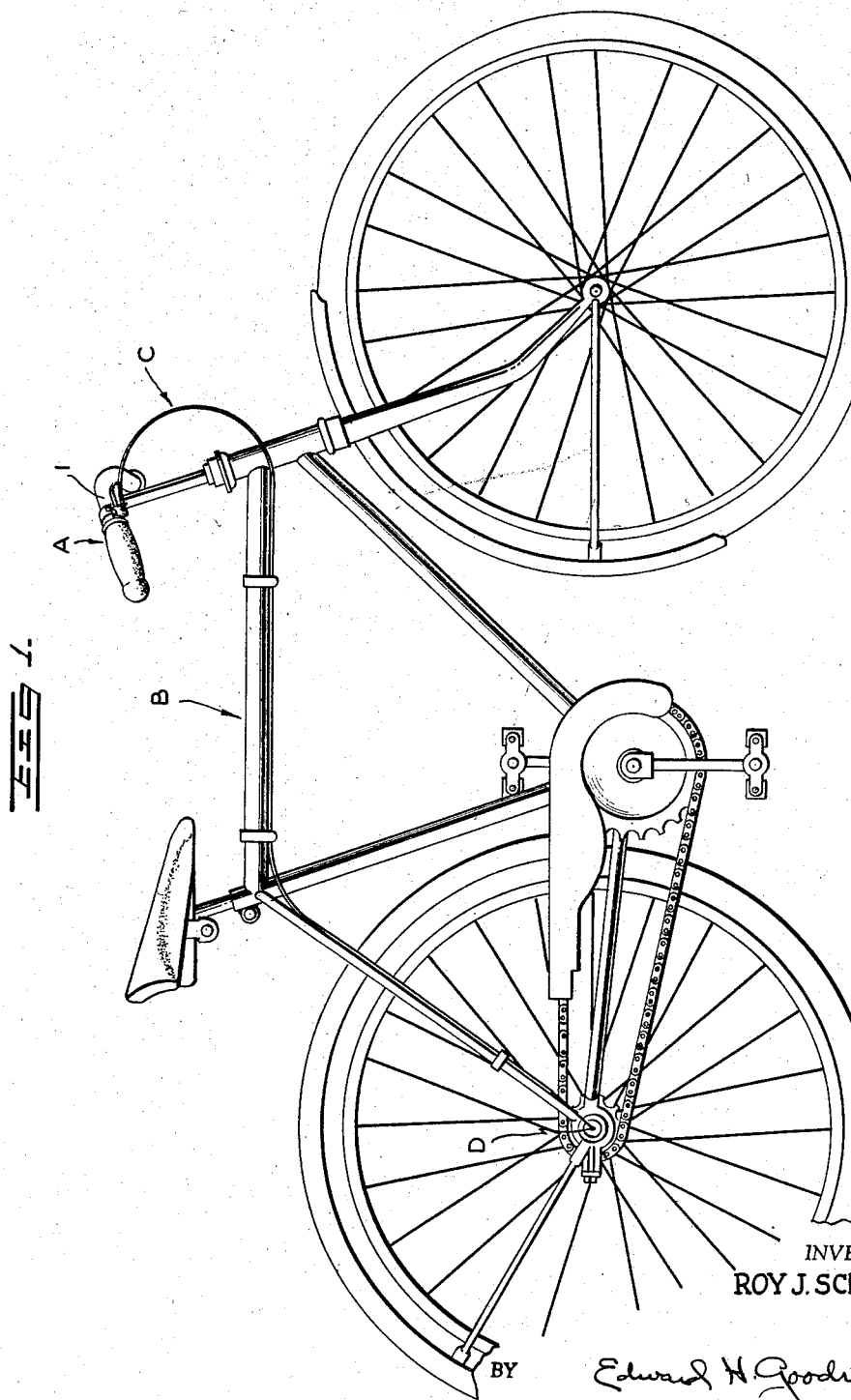

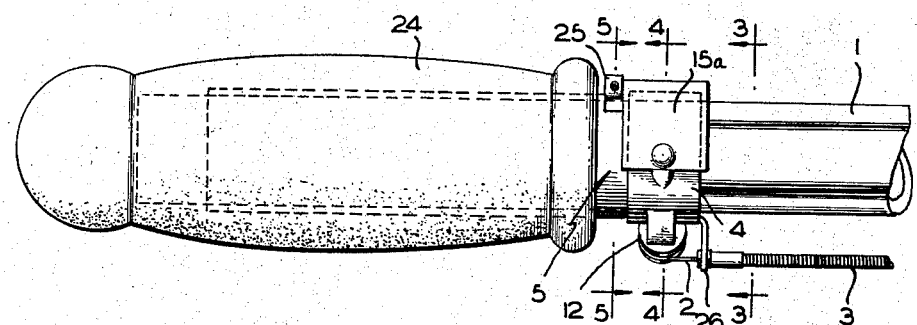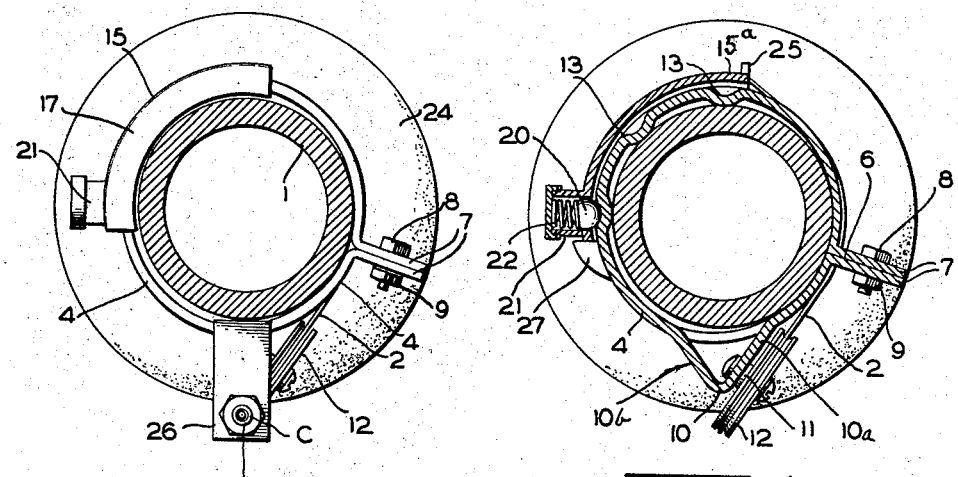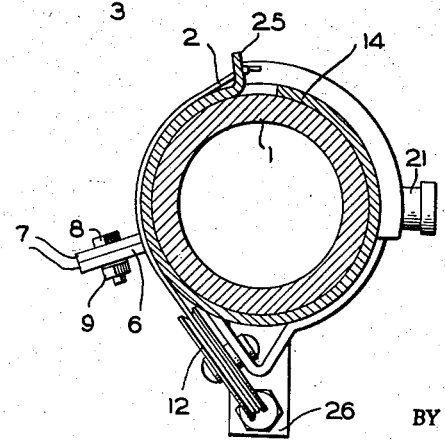

United States Patent Office 2,874,587
Patented Feb. 24, 1959

2,874,587

HAND CONTROL MECHANISM FOR VEHICLES

Roy J. Schmid, Canton, Conn., assignor to General Motors Corporation, Detroit, Mich., a corporation of Delaware Application April 9, 1956, Serial No. 577,007

1 Claim. (Cl. 74—489)

The present invention relates to a control mechanism for vehicles, and more particularly relates to a rotatable handle control mechanism for remotely controlling a device incorporated in a cycle such as a bicycle or motorcycle.

Various devices may be controlled by the control mechanism; for instance, the brake shoes of a bicycle, the multi-speed transmission of a bicycle or the carburetor of a motorcycle.

In the illustrated embodiments, my invention is shown as a control mechanism for operating a selective gear shift on a multi-speed bicycle drive.

Heretofore, the gear shift in a multi-speed bicycle drive has usually been operated through a lever mechanism mounted on the bicycle frame or on one of the handlebars. To operate this shifting mechanism, it has been necessary for the rider to remove one hand from the handlebar thus creating a serious condition of unbalance of the rider and subjecting him to the hazards of a fall from the bicycle.

An object of the invention is to provide a relatively inexpensive hand control mechanism which is safe in operation and eliminates undue stress on the hand of the operator and which may be easily operated without necessitating removal of either of the rider's hands from their normal position on the handlebar grips.

A further object is to provide a hand grip control mechanism in which the flexible cable is properly guided around the outer circumference of the rotatable handle member.

Still another object is to so construct the rotatable handle member that its rotation does not interfere with the guiding means for the cable.

Still another object is to provide a hand grip control mechanism that can be attached to a bicycle, or the like, formerly equipped with a different type of hand control.

To these ends and also to improve generally upon devices of the character indicated, my invention consists in the various matters hereinafter described and claimed. In its broader aspects this invention is not necessarily limited to the specific structures selected for illustrative purposes in the accompanying drawings wherein Fig. 1 shows a view of a bicycle, in side elevation, in which the hand control mechanism of the present invention is incorporated.

Fig. 2 is a longitudinal side view of a first embodiment of the hand control mechanism of the present invention.

Fig. 3 is a transverse section taken along line 3—3 of Fig. 2.

Fig. 4 is a transverse section taken along line 4—4 of Fig. 2.

Fig. 5 is a transverse section taken along line 5—5 of Fig. 2.

Fig. 6 is a longitudinal fragmentary section of the embodiment shown in Fig. 2 illustrating another view of the guiding means for the cable and the manner in which the handle grip of the bicycle is connected to the rotatable control member.

Fig. 7 is a longitudinal fragmentary section of a second embodiment of the invention; and Fig. 8 is a transverse section taken along line 8—8 of Fig. 7.

Referring to Fig. 1, the latter A generally designates the hand control mechanism according to the invention. The mechanism is mounted on the handle bar 1 of the bicycle B. The hand control mechanism serves to actuate a flexible control cable generally designated with the letter C. The control cable is mounted along the bicycle frame and adapted to control a multi-speed gear transmission drive D disposed in the hub of the rear wheel of the bicycle. The cable is under the tension of a spring, not shown, interconnected with the multi-speed gear transmission.

The cable is shown more particularly in Fig. 2 as a conventional Bowden cable comprising a flexible wire or cable 2 which is movable lengthwise within a flexible sheath 3. Instead of a Bowden cable any other flexible cord or cable may be used with or without a sheath.

The hand control mechanism shown in Figs. 2–6 comprises a stationary substantially annular bracket 4 and a hand operated sleeve member 5 journalled on the handlebar 1 adjacent to the bracket. The members 4 and 5 may be stamped out and bent to shape from sheet metal. The bracket 4 is split at 6 and provided with laterally extending adjacent flanges 7 for demountably clamping the bracket in a preadjusted fixed position on the handle bar 1. A nut 9 engaging the threaded portion of a bolt 8 serves to tightly clamp bracket 4 to the handle bar 1. The bracket 4 has an outwardly projecting support 10 that carries a stud 11 on which is journalled a guide pulley 12 for receiving the cable 2. A portion 10a of the support 10 may be struck out from bracket 4 and is reinforced by a bracing portion 10b. The bracket 4 is further provided with a plurality of circumferentially spaced recesses 13 that are part of a detent mechanism which will be described later in more detail. As shown in Fig. 4, three recesses 13 are provided, these corresponding to the number of speeds of the gear transmission D. The hand operated rotatable sleeve member 5 has an elongated cylindrical sleeve portion 14 rotatably fitting over the cylindrical end portion of the handle bar 1. As particularly shown in Figs. 6 and 7, this sleeve portion is provided at one end with an axially extending fragmental sleeve portion 15 of larger internal diameter. A radially extending arcuate shoulder 16 connects portion 15 to the sleeve 14. A wall 15a of the sleeve portion 15 partially and loosely surrounds the bracket 4 providing an exposed area on bracket 4 from which the aforesaid guiding pulley 12 projects. The wall 15a is cut away sufficiently to eliminate interference with the guiding pulley 12 when the sleeve 14 is partially rotated to control the cable operation. Shoulders 16 and 17 at the ends of the portion 15 overlie the ends of the bracket 14 to axially position the sleeve member 5.

The sleeve portion 15 carries a detent in the form of a ball 20 which is mounted in a thimble 21 fixed to wall 15a. The ball 20 is loaded by a compression spring 22 disposed within the thimble 21 and selectively engages one of the spaced recesses 13 of the bracket to secure the hand control mechanism in a selected gear shift position.

The recesses 13 are shown as semi-spherical indentations provided in the outer circumferential surface of bracket 4 into which a portion of the ball 20 fits. Instead of providing indentations spaced cylindrical or conical holes may be drilled in the bracket 4 for receiving the ball 20. The sleeve portion 14 of member 5 is preferably provided with a plurality of perforations 23 (see Fig. 6). A handle grip member 24 of rubber or similar material is cemented or otherwise secured on sleeve portion 14 with the perforations 23 providing a firm anchorage for the member 24.

A lug 25 struck out from sleeve 14 adjacent to the shoulder 16 serves as a holding member to which the end of cable 2 is firmly secured. The bracket 4 also carries an outwardly projecting ear or lug 26 in which the upper end of the cable sheath 3 is demountably secured. The lug 26 is located adjacent the guide pulley 12 on the end face 19 of the bracket. Stop means are provided on bracket 4 to positively limit the extreme positions of rotation of the sleeve 5. This includes stop 27 struck out of the bracket 4, and a further stop constituted by one of the flanges 7.

Before describing the modification of the control device shown in Figs. 7 and 8, the manner of mounting and operating the embodiment of Figs. 2 to 6 follows:

In mounting the hand grip control mechanism to the handle bar of the bicycle, the bracket 4, with nut 9 on bolt 8 loosened, is brought into engagement with sleeve portion 15 of sleeve member 5 having the hand grip 24 already cemented thereon. Member 5 and bracket 4 are then pushed onto the cylindrical end portion of handle bar 1 and the bracket 4 is clamped to the handle bar by tightening nut 9 on bolt 8. After that, the end of cable 2 is guided around pulley 12 and fastened to the lug 25 on sleeve member 5, and the cable sheath 3 is connected to lug 26 of bracket 4. The hand grip 24 is rotated to a desired speed shift position and the cable length is adjusted to provide the selected gear. If the multi-speed drive comprises a three speed shift, this adjustment may be made in the intermediate gear.

With this arrangement, the rider of the bicycle may shift the speed gear transmission to the selected gear by turning the handle grip 22 without taking his hands from either hand grip on the handle bar. The end of cable 2 which is guided smoothly by pulley 12 wraps partially around the sleeve 5. Turning the handle grip in one direction tensions the cable to a desired speed position and turning the handle grip in the other direction releases the cable under its spring load to shift to another speed position. The speed positions are safely selected, the detent mechanism giving a desirable feel.

A modification of the control device as shown in Figs. 7 and 8 differs only slightly from that described above. The same numerals are used for identical parts of the mechanism. As can be seen from Figs. 7 and 8, the cut-out in wall 15a of sleeve portion 15 is formed as an arcuate slot 28. The slot 28 provides an exposed area of bracket 4 which carries the guide pulley 12. The support 10 for the guide pulley projects from bracket 4 through the slot 28. Portions 10a and 10b of support 10 serve as end stops for sleeve portion 15. The left portion of wall 15a is interrupted by an axially extending slot 32 which forms an entrance for support 10 during assembly of the parts.

The axial retaining means for sleeve member 5 are constituted by a plurality of spring fingers 29 fastened to the outer surface of sleeve portion 15. Each of the spring fingers 29 has a hook-shaped end portion 30 which slidably engages the end face 19 of bracket 4, while the other end face 18 is engaged by the shoulder 16 of sleeve 5. The bracket 4 is tightly and adjustably fastened to the handle bar 1 by one or more set screws 31. In assembling the mechanism, the spring fingers 29 are lifted slightly and snapped into the illustrated retaining positions. The operation of the mechanism shown in Figs. 7 and 8 is the same as that previously described with reference to Figs. 2–6.

In certain of the annexed claims, the wall 15a of the sleeve portion 15 of sleeve member 5 is claimed as having a "cut-out" which provides an exposed area on the bracket. This term is intended to cover a wall with a slot or any other cut-away portion that eliminates interference with the guiding means for the cable when the handle grip is turned.

I claim:

In a hand grip control mechanism mounted on the handle bar of a cycle and adapted to control a device incorporated in the cycle, a substantially annular bracket secured to the handle bar, a coaxial hollow handle member associated with said bracket and rotatable on said handle bar, said hollow handle member having a first sleeve portion, a second fragmental sleeve portion axially extending from said first sleeve portion and overlying said annular bracket, means for preventing axial movement of said rotatable handle member including a flange on said fragmental sleeve member engageable with one end face of said annular bracket, the other end face of said annular bracket being in abutting relation with an opposite end face of the sleeve portion of said hollow handle member, a flexible cable secured to the handle member, a detent mechanism operatively connected to the overlapping fragmental sleeve portion of the rotatable member and the annular bracket and adapted to releasably lock said rotatable handle member in a plurality of predetermined positions relative to said bracket, stop means on the annular bracket for limiting rotation of the handle member beyond its first and last operating position, and guiding means for said flexible cable including a pulley journalled about a stud projecting from said annular bracket for guiding said cable around the outer circumference of said rotatable handle member, said pulley and stud being located in an area of the annular bracket substantially opposite said overlapping fragmental sleeve portion of said rotatable member.

References Cited in the file of this patent

UNITED STATES PATENTS

| 619,103 | Weyde | Feb. 7, 1899 |

FOREIGN PATENTS

| 138,936 | Sweden | Jan. 27, 1953 |
| 530,062 | Great Britain | Dec. 4, 1940 |
| 668,606 | Great Britain | Mar. 19, 1952 |
| 988,874 | France | May 16, 1951 |
| 1,114,168 | France | Dec. 12, 1955 |